Jan. 12, 1932.  A. C. ROESSLER  1,841,337
FLUID RELIEF VALVE
Filed Jan. 10, 1929
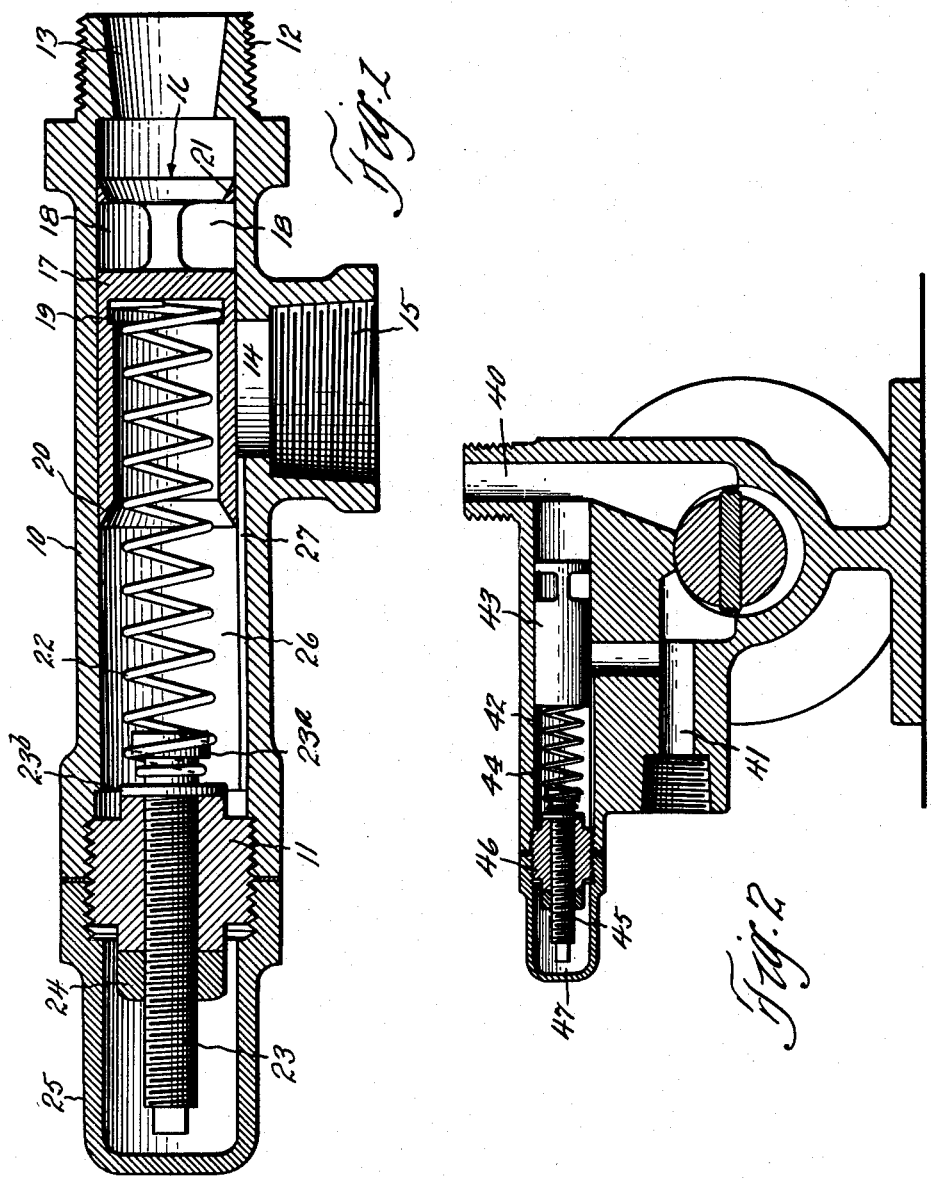
Inventor
Armandus C. Roessler
By Hull, Brock & West
Attorney Patented Jan. 12, 1932

1,841,337

UNITED STATES PATENT OFFICE

AMANDUS C. ROESSLER, OF LAKEWOOD, OHIO, ASSIGNOR TO ROMEC CORPORATION, OF BEAVER FALLS, PENNSYLVANIA, A CORPORATION OF OHIO

FLUID RELIEF VALVE

Application filed January 10, 1929. Serial No. 331,447.

This invention relates to spring controlled relief valves for fluid pumps or other apparatus wherein excess pressures are apt to be created.

The fluid relief valves now in use have several objectionable features, such as chattering and pounding during operation, lack of sensitiveness to small differences of pressure, and they are unreliable in their operation. Chattering is usually caused when the valve is only partly open and there is only enough pressure against the spring to cause an alternate seating and unseating of the valve in a rapid succession of impulses against its seat. The pounding is due to the quick release of pressure in the line. Lack of sensitiveness is usually due to the length of the spring which is usually quite short. Unreliability is often due to the valve beating down on its seat, and when placed between the discharge and suction end of the lines of a pump, the suction tends to keep the valve off its seat thus preventing it from closing properly.

The object of my invention is to provide a relief valve which has none of the above mentioned objectionable features, and more particularly to provide a relief valve which will be silent in operation, and which will operate effectively under small pressure variations.

With these and other objects in view, my invention resides in the various novel features of construction and combination, all of which are hereinafter described and pointed out in the appended claims.

In the drawings Fig. 1 is a sectional elevation of my improved relief valve; Fig. 2 is a sectional elevation of a pump with the relief valve formed as an integral part thereof.

Describing by reference characters the embodiments of the invention as illustrated in the drawings, 10 designates the body of the valve which is tubular in form with a cylindrical bore, one end is internally threaded and is closed by the threaded plug 11. The other end 12 is externally threaded for attaching the same to the pressure line or side of the pump. The end 12 has a tapered bore 13 providing a funnel shaped passage with the smaller end opening into the cylindrical bore of the body 10. On one side of the body 10 is a port 14 which may lead directly to the atmosphere or the body may be provided with an attaching portion 15 for connection with the vacuum or low pressure side of the pump, compressor or the like.

Slidably received in the cylindrical bore of the body 10 is the valve member 16 which is in the form of a tube open at its ends but closed intermediate its ends by a wall or partition 17. On the one side of the partition 17 the wall of the tube is provided with apertures 18. The inner wall of the other end of the tube 16 is provided, adjacent the partition 17, with an annular groove 19. As will be noted the bore at the ends of the tubular valve 16 are tapered as at 20 and 21. Received within the end of the valve member and having its end enlarged and received in the annular groove 19 is a coil spring 22. Attached to the other end of the spring 22 is an adjusting screw 23 having enlarged end 23ª and integral collar 23ᵇ between which a coil of the spring is secured, said adjusting screw being threaded through the plug 11 which closes the end of the body 10. To retain the adjusting screw in any desired position in the plug 11 the lock nut 24 is provided. Encasing the end of the adjusting screw and lock nut is a cap nut 25 which screws on the outer end of the plug 11 and forms a continuation of the body 10. The valve 16 from the apertures 18 to the end on the other side of the partition 17 is of a sufficient length to provide a good sliding bearing surface in the body 10 and to close the outlet port 14.

The spring is adjusted so that the valve closes the port 14, as shown in the figure and it will be noted that the valve end does not abut against any valve seat when the outlet is closed. The spring 22 normally being under no tension will not deteriorate as rapidly as a spring which is normally compressed or extended and its resiliency will remain practically constant. It will be noted that the spring 22 which is secured in the piston valve 16 acts as a tension spring when the valve is forced to the right past its normal position due to a sudden drop of pressure at 13. The tapered bore in the end of the body at 13 and the tapered end 21 of the valve direct any foreign matter that may enter the valve under the pressure of the fluid to the center of the member 16, and tends to prevent its getting between the valve member 16 and the casing 10. To permit communication between the spring chamber 26 and the outside atmosphere, or the lower pressure side of the pump, the casing 10 is provided on its inner wall with a passage 27 leading from the port 14 to the closed end of the spring chamber.

The valve may be used in any position and when used in a vertical position with the inlet 12 up, the spring need not be secured to the valve sleeve or the adjusting screw although the arrangement shown is to be preferred.

The valve may also be built integral with the pump as shown in Fig. 2, in which the discharge port is indicated at 40, the inlet or suction port at 41, and the valve chamber at 42, with the valve member 43, spring 44, adjusting screw 45, plug 46 and cap 47 all arranged in the manner set forth in the description of Fig. 1.

The operation of the valve will be apparent. The inlet end 12 is attached to the discharge or pressure side of the pump at any convenient point, the outlet 15 is connected to the low pressure or suction side of the pump or to any other place where it is desired to deliver the discharge, such as a storage tank, or simply to the atmosphere. The adjusting screw 23 is set to allow the valve to open at the desired pressure. When the pressure of the fluid in the pressure line becomes greater than the predetermined pressure the valve member 16 is urged to the left against the pressure of the spring until the openings 18 communicate with port 14 and the fluid escapes through the outlet at 14. Any fluid which may have found its way into the chamber 26 passes out through the channel 27 to the outlet 14. When the pressure in the line goes down the spring urges the valve member to its original position over the outlet 14. Any tendency of the member 16 to go further is overcome by the spring 22 which then acts as a tension spring. When the outlet 14 is connected to the suction line there is no tendency of the suction to keep the valve open as in the case of valves which are urged against a valve seat.

It is apparent that since there is no valve seat there will be no pounding or chattering when the valve is in operation.

Having thus described my invention, what I claim is:—

1. A fluid relief valve comprising a casing member having a cylindrical bore, with an inlet port communicating with the high pressure end of said bore, and an outlet port on one side of said casing, a closure for the low pressure end of said casing, an adjusting screw threaded axially through said closure, a coil spring in the bore positioned on the end of said screw, a piston member slidably received in the bore of said casing with a fluid tight fit, said piston comprising a tubular member closed intermediate its ends by a partition forming sockets in the ends thereof, the socket on the low pressure end of said piston receiving the other end of said spring, there being apertures in the wall of the socket portion of the piston on the high pressure end, the piston adapted to be held by the spring in a position in the bore of the casing normally closing the outlet port, the apertures in the pressure end of the piston adapted to communicate with the outlet when the piston is moved against the pressure of the spring by the pressure of the fluid in the inlet side of the casing.

2. A fluid relief valve comprising a cylindrically bored casing member, an inlet communicating with the bore at one end of said casing, and arranged concentric therewith, the bore of said inlet being tapered inwardly from its outer end and of a diameter less than the diameter of the bore of the casing, a piston member slidably received in said casing, said piston having a socket in each end, the pressure end having cut-out portions, the ends being counterbored to provide tapering edges, a spring received in the socket in the low pressure end, a closure in the low pressure end of said casing against which the opposite end of the spring bears, the casing being provided with an outlet port on its side normally closed by said piston member, the apertures in the pressure end of said piston communicating with the outlet when the piston is moved toward the low pressure end of the casing under the pressure of the fluid in the high pressure end, thereby allowing the fluid to pass out of the outlet until the pressure is reduced.

3. A fluid relief valve comprising a casing having a cylindrical bore extending therethrough, an apertured plug threaded in one end of said bore, an adjusting screw threaded through the aperture in said plug, the plug extending outwardly from said casing, a cap threaded thereon constituting a closure for said adjusting screw, a spring secured to the inner end of said screw, a slidable piston snugly fitting in the bore of said casing, said piston having a socket receiving the free end of said spring, the casing being provided with an inlet port in the end of said cylinder and an outlet port at one side of said cylindrical bore and intermediate the ends thereof, said outlet being normally closed by said piston when the same is held against the spring by the pressure at the inlet end of said casing, said piston adapted to be pressed toward the closed end of the casing by the fluid when a predetermined pressure is exceeded whereby the outlet is opened until the pressure is reduced, the casing being provided with means to prevent a pressure from being built up in the closed end of the cylinder when the piston is moved toward the low pressure end thereof.

In testimony whereof, I hereunto affix my signature.

AMANDUS C. ROESSLER.